Figures 1, 2:
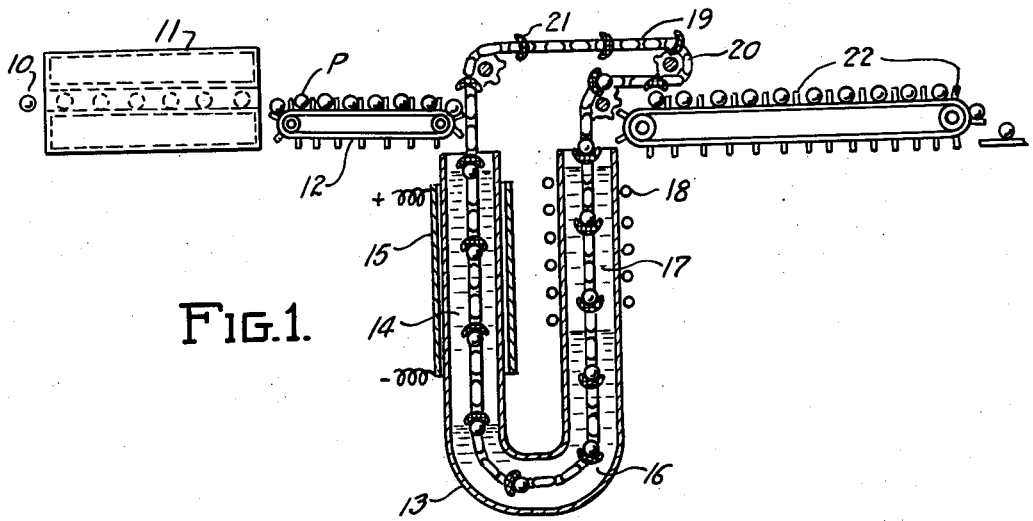

April 26, 1949.	R. W. GUNNELL	2,468,060
METHOD AND APPARATUS FOR THE
MANUFACTURE OF CAPSULES
Filed Feb. 1, 1946

INVENTOR.
ROBERT W. GUNNELL

Patented Apr. 26, 1949

2,468,060

UNITED STATES PATENT OFFICE 2,468,060

METHOD AND APPARATUS FOR THE MANUFACTURE OF CAPSULES

Robert W. Gunnell, Detroit, Mich., assignor to Industrial Sound Systems, Inc., Cleveland, Ohio, a corporation of Ohio Application February 1, 1946, Serial No. 644,839

10 Claims. (Cl. 18—1)

This invention relates to a method and apparatus for the manufacture of capsules, and an object is to produce a new and improved method of capsulating material, such for example, as a paste which is ordinarily not self-sustaining, in which the material to be capsulated is solidified by refrigeration before being introduced into or passed through a thermoplastic coating liquid, thereby insuring that a seamless, leak-proof coating is formed on a normally fluid paste which may have varying viscosities and flow characteristics.

In my prior Patent 2,342,661, dated February 29, 1944, I have shown and described a method and apparatus for manufacturing capsules in which liquid globules which have previously been refrigerated, are introduced into a thermoplastic liquid coating and in which the globules collect a coating and then rise through a column of conditioning liquid superposed upon the coating liquid. According to this method, capsules have been satisfactorily produced, but this invention is concerned more particularly with the capsulating of a pasty or a fluid or semi-fluid material, such as vitamin-containing oils containing suspensoids.

According to one aspect of this invention, pellets may be produced from a paste in molded form so that the pellets are virtually identical with each other. For example, the pellets may be formed by introducing the material into a cold mold and then further freezing it into solid form, whereupon it is then capsulated, the frozen pellet collecting the coating from the thermoplastic coating liquid.

For purposes of illustration but not of limitation, embodiments of the invention are diagrammatically shown on the accompanying drawings, in which Figure 1 is a schematic view partly in section of an apparatus for capsulating materials which are of solid form at least at the time they are introduced into the liquid coating; and Figure 2 is a schematic sectional elevation of an apparatus for coating pellets which are of such relative specific gravity that they will drop through the thermoplastic coating liquid.

Referring to the drawings and particularly to Figure 1, 10 designates a molding of the material to be capsulated which may be formed into any desired shape or configuration after the material, if not self-sustaining such as vitamin containing oils containing suspensoids, has been sufficiently cooled to retain its shape for a short time. After being molded or formed into the desired shape, the molded pellets are introduced into a freezing unit or refrigerator 11 wherein the pellets are further cooled or solidified to be self-sustaining. Thereupon, the pellets, indicated at P, are delivered to a conveyor 12 which delivers them successively to a substantially U-shaped receptacle 13 into which the pellets are first brought into contact with a column of thermoplastic liquid coating 14 which may consist by way of example, of gelatin, glycerin and water, and reference is hereby made to my above mentioned patent, wherein a satisfactory coating liquid and the properties thereof, are set out, it being understood, however, that other thermoplastic coating liquids of suitable characteristics may be employed for the purpose.

In order to maintain the coating liquid 14 at the proper temperature, a suitable heating unit indicated at 15 is employed. The column of coating liquid is superposed upon a column 16 of a relatively heavy liquid, such, for example, as acetylene tetrabromide, which is immiscible with the gelatin sol. The column rises part way in the second upright of the U-shaped receptacle and superposed on the column 16 is a column 17 of a lighter fluid, such, for example, as water or an aqueous solution of an inert salt of such specific gravity as will cause it to float on the column 16, i. e. the liquid in the column 17 must be of less specific gravity than the liquid in the column 16. The column 17 is maintained at relatively low temperatures by cooling coils 18, for the purpose of hardening or solidifying the deposited thermoplastic coating material during the time of passage therethrough.

An endless conveyor 19 which is suitably guided over sprockets or sheaves 20 and driven in any suitable manner, is equipped with a series of spaced pushers in the form of screen cups or thimbles 21. The conveyor 19 operates in timed relation to the conveyor 12 individually and successively to take the pellets from the conveyor 12 and forcefully propel them through the liquid columns above mentioned. It is to be here understood that the movements of the pellets through the liquid columns may be effected by other means in cooperation with the force conveyor. For example, the selection of a coating formulation having a lower specific gravity when heated than the content material comprising the capsule, will result in the downward movement of the cold capsule in response to gravitational forces. In a like manner, the selection of a conditioning liquid in column 17 having a specific gravity when cold which is greater than the coated content material, will cause a rise of the coated pellet therethrough in response to gravitational forces. In such instances, the conveyor 19 operates first to guide the pellet around the U bend and through the heavier buffer liquid column 16, and secondly, to maintain a spaced relation between pellets for cooperation with the feed and delivery conveyors.

During the passage of the pellets P through the column 14 of coating liquid, the cold pellets collect a coating and then as they are passed through the column 16 of the relatively heavy liquid, some of the excess coating material is removed and during the passage through the column 17 of float liquid, the coating is preliminarily conditioned or hardened. The rate of movement of the conveyor 19 is so chosen that when the pellets finally are elevated from the float column 17, the coating is in such condition that the pellets can be delivered to a conveyor 22 which is driven to move in timed relation to the conveyor 19. The length of the conveyor 22 is determined by the time required to air dry the capsules before being finally discharged for packaging. If desired, means (not shown) may be provided for creating a current of air over the capsules as they are carried along by the conveyor 22, increasing the drying or evaporation rate.

In the form of the invention shown in Figure 2, the U-shaped receptacle comprises vertically disposed tubes 23a and 23b interconnected at their lower ends by a horizontal tube or connector 23c. The tube 23a contains a thermoplastic coating material 24 which is fluid at the elevated temperatures maintained and regulated by heating units which may be strip or jacket heaters as indicated at 25. The coating material is superposed upon a column 26 of conditioning liquid such as carbon tetrachloride or perchlorethylene which being immiscible with the coating liquid and of greater specific gravity forces the lighter coating liquid to be positioned in the upper portion of the tube 23a. As illustrated, the conditioning liquid also fills the connecting tube 23c and the other tube 23b of the U-shaped receptacle. Since the pressures in each tube must be equal, it is manifest that the level of fluid in the tube 23a containing the lighter coating liquid will be higher than the other column containing only the conditioning liquid. Thus, the outlet chute 28 is positioned at a lower level for purposes of delivery of the conditioned and coated pellets. Cooling coils 27 encircle the shorter tube 23b keeping the temperature of the conditioning liquid relatively low.

It is to be understood that a continuous circulation of cooled conditioning liquid may be maintained in tube 23b for purposes of maintaining the proper low temperature as well as aiding the delivery of pellets into the chute 28 and washing out any of the coating material that may rise and be collected on the surface which otherwise would be detrimental.

Within the receptacle is an endless conveyor 29, one run 29' of which extends along the bottom part of the connector 23c in position to receive the capsules between the projections 30 and then extends upwardly as indicated at 29" to lift the capsules through the arm 23b of the receptacle and discharge them into the chute 28. This apparatus lends itself particularly to the capsulating of molded refrigerated pellets of powdery or granular substance, it being understood that the pellets are formed by molding and then further solidified by refrigeration, as above explained. They are then dropped into the first tube of the receptacle and since the specific gravity of the content material is greater than that of either of the two liquids comprising columns 24 or 26, the pellet moves downwardly in response to gravitational forces and during their downward passage, they collect a coating from the thermoplastic coating liquid and then pass a short distance further through the conditioning liquid until they are engaged by the conveyor which carries them through the remainder of the conditioning liquid, at which time they are sufficiently cooled and solidified so that they can be discharged into the chute 28. Thereafter, the capsules may be air-dried before being packaged.

It is to be understood that numerous changes in details of construction and choice of materials may be effected without departing from the spirit of the invention especially as defined in the appended claims.

What I claim is:

1. The method of forming capsules which consists in solidifying the substance to be capsulated into pellets by refrigeration, passing the refrigerated uncoated pellets through a thermoplastic coating liquid thereby to enable the cold pellets to collect a coating, and then introducing the coated pellet into a conditioning liquid for congealing the coating.

2. The method of forming capsules which consists in refrigerating a material to produce a solid mass, passing the uncoated refrigerated material through a heated body of coating liquid, collecting a coating on said material, and then cooling the coated material to harden same.

3. The method of forming capsules which consists in refrigerating a pellet in paste form, passing the refrigerated uncoated pellet through a body of gelatin in liquid form to collect a coating thereon, and then passing the coated pellet through a body of cooling liquid to harden the coating.

4. The method of forming capsules which consists in molding a pellet from oils containing suspensoids, solidifying the pellet by refrigeration, causing the uncoated pellet to collect a coating by passing the refrigerated pellet through a heated body of gelatin in liquid form, and then passing the coated pellet through a cooling liquid.

5. The method of forming capsules which consists in passing through a heated body of thermoplastic coating liquid, a molded refrigerated uncoated pellet of higher specific gravity than the cooling liquid for enabling the pellet to collect a coating, and propelling the pellet successively through the coating liquid and allowing a coating to collect thereon and then through a cooling liquid to congeal the coating.

6. The method of forming capsules which consists in refrigerating a material to form an uncoated solid pellet, providing successively arranged bodies of thermoplastic coating liquid, excess coating removing liquid and a cooling liquid, the liquids of said bodies being immiscible and of different specific gravities, and passing the refrigerated pellet successively through said liquid bodies in the order mentioned.

7. The method of forming capsules as claimed in claim 6, in which the thermoplastic coating liquid consists of a gelatin solution, and the excess coating removing liquid consisting of a liquid of the order of acetylene tetrabromide.

8. The method of forming capsules which consists in refrigerating a material to form a solid uncoated pellet, passing the refrigerated pellet through a body of gelatin in liquid form superposed upon a body of relatively heavy liquid immiscible with gelatin, allowing a coating of gelatin to form on the pellet and then passing the coated pellet through the heavy liquid for removing excess coating liquid.

9. Apparatus for forming capsules comprising means for freezing a material to form a solid uncoated pellet, a receptacle having a column of liquid coating solution and a column of cooling liquid, and means for advancing the frozen pellet successively through the coating solution and then the cooling liquid.

10. The method of forming capsules which consists in molding a material to the desired form, introducing the molded uncoated form into a refrigerator for solidifying same, passing the refrigerated form through a thermoplastic coating liquid, allowing a coating to collect on the refrigerated form, passing the coated form through another liquid for conditioning the coating, and then hardening the coated form.

ROBERT W. GUNNELL.

REFERENCES CITED

The following references are of record in the file of this patent:

UNITED STATES PATENTS

| Number | Name | Date |
| --- | --- | --- |
| 2,125,827 | Turkington | Aug. 2, 1938 |
| 2,275,154 | Merrill et al. | Mar. 31, 1942 |
| 2,331,572 | Scherer I | Oct. 12, 1943 |
| 2,339,114 | Scherer II | Jan. 11, 1944 |
| 2,342,661 | Gunnell | Feb. 29, 1944 |
| 2,379,816 | Mabbs | July 3, 1945 |